United States Patent
Miyajima (10) Patent No.: US 6,915,512 B1
(45) Date of Patent: Jul. 5, 2005

(54) SOFTWARE EDITING WITH INDICATION OF FORMAT AND PROCESSING STATE OF EACH PROCESS OF THE SOFTWARE

(75) Inventor: Tsuyoshi Miyajima, Matsumoto (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 09/645,503

(22) Filed: Aug. 25, 2000

(30) Foreign Application Priority Data

Nov. 29, 1999 (JP) .......................................... 11-338714

(51) Int. Cl.$^7$ ............................................... G06F 9/44
(52) U.S. Cl. ........................ 717/168; 717/175; 717/162
(58) Field of Search ................................. 717/168, 175, 717/162, 169, 170, 171, 172, 173, 174, 179, 176, 177, 178

(56) References Cited

U.S. PATENT DOCUMENTS

| | | | |
|---|---|---|---|
| 5,155,847 A | * | 10/1992 | Kirouac et al. ............. 709/221 |
| 5,237,688 A | * | 8/1993 | Calvert et al. ............. 717/121 |
| 5,307,498 A | * | 4/1994 | Eisen et al. ................. 717/158 |
| 5,339,430 A | * | 8/1994 | Lundin et al. .............. 709/332 |
| 5,481,713 A | * | 1/1996 | Wetmore et al. ........... 717/121 |
| 5,546,586 A | * | 8/1996 | Wetmore et al. ........... 717/122 |
| 5,553,290 A | * | 9/1996 | Calvert et al. ............. 717/121 |
| 5,577,244 A | * | 11/1996 | Killebrew et al. .......... 717/169 |
| 5,619,698 A | * | 4/1997 | Lillich et al. .............. 717/168 |
| 5,732,272 A | * | 3/1998 | Gochee ...................... 717/128 |
| 5,920,721 A | * | 7/1999 | Hunter et al. .............. 717/159 |
| 5,920,725 A | * | 7/1999 | Ma et al. .................... 717/171 |
| 5,938,766 A | * | 8/1999 | Anderson et al. .......... 713/100 |
| 5,974,470 A | * | 10/1999 | Hammond ................... 709/331 |
| 6,049,672 A | * | 4/2000 | Shiell et al. ................ 717/168 |
| 6,052,531 A | * | 4/2000 | Waldin et al. .............. 717/170 |
| 6,074,434 A | * | 6/2000 | Cole et al. .................. 717/173 |
| 6,134,614 A | * | 10/2000 | Chari et al. ................ 710/302 |

(Continued)

FOREIGN PATENT DOCUMENTS

| | | |
|---|---|---|
| JP | 61-234433 | 10/1986 |
| JP | 63-109558 | 5/1988 |
| JP | 63-115234 | 5/1988 |
| JP | 63-178325 | 7/1988 |
| JP | 1-131925 | 5/1989 |
| JP | 1-201728 | 8/1989 |
| JP | 6-242990 | 9/1994 |
| JP | 10-198569 | 7/1998 |

OTHER PUBLICATIONS

"The Norton Utilities Version 5.0 User's Guide", Disk Editor, pp. 55–57, 1990.*

*Primary Examiner*—Todd Ingberg
(74) *Attorney, Agent, or Firm*—Staas & Halsey LLP (57) ABSTRACT

A software editing apparatus is provided with an input unit for inputting an information file which includes editing parts and editing contents with respect to a software which is provided in a form which is not directly editable, and an editing unit for editing the software based on the information file during operation of the software.

18 Claims, 7 Drawing Sheets

U.S. PATENT DOCUMENTS

| | | | | |
|---|---|---|---|---|
| 6,135,651 A | * | 10/2000 | Leinfelder et al. | 717/168 |
| 6,138,274 A | * | 10/2000 | Huang et al. | 717/168 |
| 6,161,218 A | * | 12/2000 | Taylor | 717/174 |
| 6,167,407 A | * | 12/2000 | Nachenberg et al. | 707/203 |
| 6,189,145 B1 | * | 2/2001 | Bellin et al. | 717/170 |
| 6,199,204 B1 | * | 3/2001 | Donohue | 717/178 |
| 6,202,199 B1 | * | 3/2001 | Wygodny et al. | 717/125 |
| 6,202,207 B1 | * | 3/2001 | Donohue | 717/173 |
| 6,202,208 B1 | * | 3/2001 | Holiday, Jr. | 717/166 |
| 6,216,175 B1 | * | 4/2001 | Sliger et al. | 717/169 |
| 6,230,316 B1 | * | 5/2001 | Nachenberg | 717/169 |
| 6,243,766 B1 | * | 6/2001 | Sliger et al. | 710/2 |
| 6,289,509 B1 | * | 9/2001 | Kryloff | 717/170 |
| 6,295,644 B1 | * | 9/2001 | Hsu et al. | 717/158 |
| 6,298,481 B1 | * | 10/2001 | Kosaka et al. | 717/110 |
| 6,308,326 B1 | * | 10/2001 | Murphy et al. | 717/174 |
| 6,314,567 B1 | * | 11/2001 | Oberhauser et al. | 717/170 |
| 6,363,524 B1 | * | 3/2002 | Loy | 717/170 |
| 6,425,125 B1 | * | 7/2002 | Fries et al. | 717/168 |
| 6,427,236 B1 | * | 7/2002 | Chamberlain et al. | 717/174 |
| 6,449,764 B1 | * | 9/2002 | Sliger et al. | 717/170 |
| 6,477,703 B1 | * | 11/2002 | Smith et al. | 717/168 |
| 6,496,974 B1 | * | 12/2002 | Sliger et al. | 717/106 |
| 6,496,977 B1 | * | 12/2002 | Hamilton et al. | 717/168 |
| 6,526,574 B1 | * | 2/2003 | Jones | 717/168 |
| 6,629,315 B1 | * | 9/2003 | Naylor | 717/168 |
| 6,681,391 B1 | * | 1/2004 | Marino et al. | 717/175 |
| 6,684,396 B1 | * | 1/2004 | Brittain et al. | 717/168 |
| 6,684,397 B1 | * | 1/2004 | Byer et al. | 717/174 |
| 6,779,176 B1 | * | 8/2004 | Chambers et al. | 717/169 |

* cited by examiner

DO YOU WISH TO EDIT SOFTWARE ? IF YES, DISK STORING EDITING
INFORMATION IS REQUIRED.

| Y E S | | N O |

F I G. 7

EDITING SOFTWARE.
INSERT 'ServerWizard VI.0L40 Editing Disk TF01234' AND
SELECT [ O K ] .

| O K | | C A N C E L |

FIG. 8

INFORMATION FILE

| PROCESSING FORMAT NUMBER = ① | PROCESSING FORMAT NUMBER = ② |
|---|---|
| PROCESS NUMBER = N 1 | PROCESS NUMBER = N 2 |
| UTILIZING SOFTWARE PART SWP1 | UTILIZING SOFTWARE PART SWP3 |
| UTILIZING SOFTWARE PART SWP2 | UTILIZING SOFTWARE PART SWP4 |
| PROCESS NUMBER = N 2 | PROCESS NUMBER = N 4 |
| UTILIZING SOFTWARE PART SWP3 | UTILIZING SOFTWARE PART SWP3 |
| PROCESS NUMBER = N 5 | PROCESS NUMBER = N 5 |
| UTILIZING SOFTWARE PART SWP1 | UTILIZING SOFTWARE PART SWP1 |
| UTILIZING SOFTWARE PART SWP3 | UTILIZING SOFTWARE PART SWP2 |
| ⋮ | ⋮ |
| PROCESS NUMBER = N n | PROCESS NUMBER = N n |

FIG. 9

| PROCESS COMPLETE FLAG | ～31 |
|---|---|
| PROCESS NUMBER | |
| PROCESSING FORMAT NUMBER | |

SOFTWARE EDITING WITH INDICATION OF FORMAT AND PROCESSING STATE OF EACH PROCESS OF THE SOFTWARE

BACKGROUND OF THE INVENTION

1. Field of the Invention

The present invention generally relates to software editing methods and apparatuses and storage media, and more particularly to a software editing method and apparatus for editing software in an information processing apparatus, and to a computer-readable storage medium which stores a program for causing a computer to carry out such a software editing.

In this specification, "software editing" includes correcting and updating software. For example, the software is corrected when a bug or the like exists in the software, and the software is updated when the version of the software is to be updated to a most recent version.

2. Description of the Related Art

In a case where the software used by the information processing apparatus such as a computer system is editable, the software editing can be carried out by providing an editing software, a patch software or the like.

The software used by the information processing apparatus includes operating systems, applications, game software, programs, and various kinds of software such as an installation support tool which supports the user when installing such software in the information processing apparatus.

On the other hand, in a case where the software used by the information processing apparatus is stored in a non-editable recording medium such as a CD-ROM, it is impossible to edit the software directly even if the editing software or the patch software is provided. Accordingly, in such a case, an edited software is used by newly providing a recording medium which stores the edited software.

However, when directly editing the software by use of the editing software, the patch software or the like, unless performed by a skilled operator, it is difficult to efficiently and accurately edit parts of the software which need to be edited.

On the other hand, when newly providing the recording medium which stores the edited software, an accurate editing is guaranteed because the edited software is used, and the software editing does not require a skilled operator. But in this case, there is a problem in that the recording medium which stores the existing software is totally wasted.

Presently, the software is constructed from a plurality of files or modules.

In general, in a case where a plurality of files of the software need to be edited, the editing process is carried out by subjecting all of these files which need to be edited to the editing process.

Therefore, the editing process requires an editing time corresponding to the number of files of the software which need to be edited. Furthermore, a storage capacity required to store the files increases after the editing process is carried out, and the storage capacity of a main storage or the like occupied by the edited software during execution or operation accordingly, increases.

As a result, there are problems in that the processing speed of the edited software itself decreases, the edited software prevents execution of other software due to insufficient resources caused by the relatively large storage capacity occupied by the edited software, and the processing speed of the information processing apparatus as a whole decreases due to these reasons.

SUMMARY OF THE INVENTION

Accordingly, it is a general object of the present invention to provide a novel and useful software editing method and apparatus and computer-readable storage medium, in which the problems described above are eliminated.

Another and more specific object of the present invention is to provide a software editing apparatus and a computer-readable storage medium which enable editing of a software during execution of the software, even if the software is provided in a form which makes it impossible to directly edit the software, and which enable efficient utilization of resources by making it possible to use existing software as it is.

Still another object of the present invention is to provide a software editing apparatus comprising input means for inputting an information file which includes editing parts and editing contents with respect to a software which is provided in a form which is not directly editable, and editing means for editing the software based on the information file during operation of the software. According to the software editing apparatus of the present invention, it is possible to edit the software during operation even in a case where the software is provided in the form which is not directly editable. Hence, by making it possible to use as it is a recording medium which stores an existing software, the resources can be efficiently utilized.

A further object of the present invention is to provide a computer-readable storage medium which stores a program for causing a computer to edit a software which is provided in a form which is not directly editable, where the program comprises an input procedure which causes the computer to input an information file which includes editing parts and editing contents with respect to the software, and an editing procedure which causes the computer to edit the software based on the information file during operation of the software. According to the computer-readable storage medium of the present invention, it is possible to edit the software during operation even in a case where the software is provided in the form which is not directly editable. Hence, by making it possible to use as it is a recording medium which stores an existing software, the resources can be efficiently utilized.

Another object of the present invention is to provide a software editing apparatus comprising. input means for inputting operation information prescribing a plurality of processing forms and editing information prescribing editing contents with respect to a software, specifying means for specifying editing contents of the software necessary for a process in a processing form which is selected for operation of the software, and editing means for editing the software depending on the specified editing contents. According to the software editing apparatus of the present invention, of the files which need to be edited of all of the files forming the software, only the files required for a desired operation are edited. In other words, only the files of the software which are used for a selected processing format are subject to the editing. For this reason, it is possible to reduce the time required for the software editing, thereby making it possible to suppress the increase of the storage capacity occupied by the edited software.

Still another object of the present invention is to provide a computer-readable storage medium which stores a program for causing a computer to edit a software, where the program comprises an input procedure which causes the computer to input operation information prescribing a plurality of processing forms and editing information prescribing editing contents with respect to a software, a specifying procedure which causes the computer to specify editing contents of the software necessary for a process in a processing form which is selected for operation of the software, and an editing procedure which causes the computer to edit the software depending on the specified editing contents. According to the computer-readable storage medium according to the present invention, of the files which need to be edited of all of the files forming the software, only the files required for a desired operation are edited. In other words, only the files of the software which are used for a selected processing format are subject to the editing. For this reason, it is possible to reduce the time required for the software editing, thereby making it possible to suppress the increase of the storage capacity occupied by the edited software.

A further object of the present invention is to provide a software editing method comprising the steps of (a) inputting an information file which includes editing parts and editing contents with respect to a software which is provided in a form which is not directly editable, and (b) editing the software based on the information file during operation of the software. According to the software editing method of the present invention, it is possible to edit the software during operation even in a case where the software is provided in the form which is not directly editable. Hence, by making it possible to use as it is a recording medium which stores an existing software, the resources can be efficiently utilized.

Another object of the present invention is to provide a software editing method comprising the steps of (a) inputting operation information prescribing a plurality of processing forms and editing information prescribing editing contents with respect to a software, (b) specifying editing contents of the software necessary for a process in a processing form which is selected for operation of the software, and (c) editing the software depending on the specified editing contents. According to the software editing method of the present invention, of the files which need to be edited of all of the files forming the software, only the files required for a desired operation are edited. In other words, only the files of the software which are used for a selected processing format are subject to the editing. For this reason, it is possible to reduce the time required for the software editing, thereby making it possible to suppress the increase of the storage capacity occupied by the edited software.

Other objects and further features of the present invention will be apparent from the following detailed description when read in conjunction with the accompanying drawings.

DESCRIPTION OF THE PREFERRED EMBODIMENTS

Figure 1:
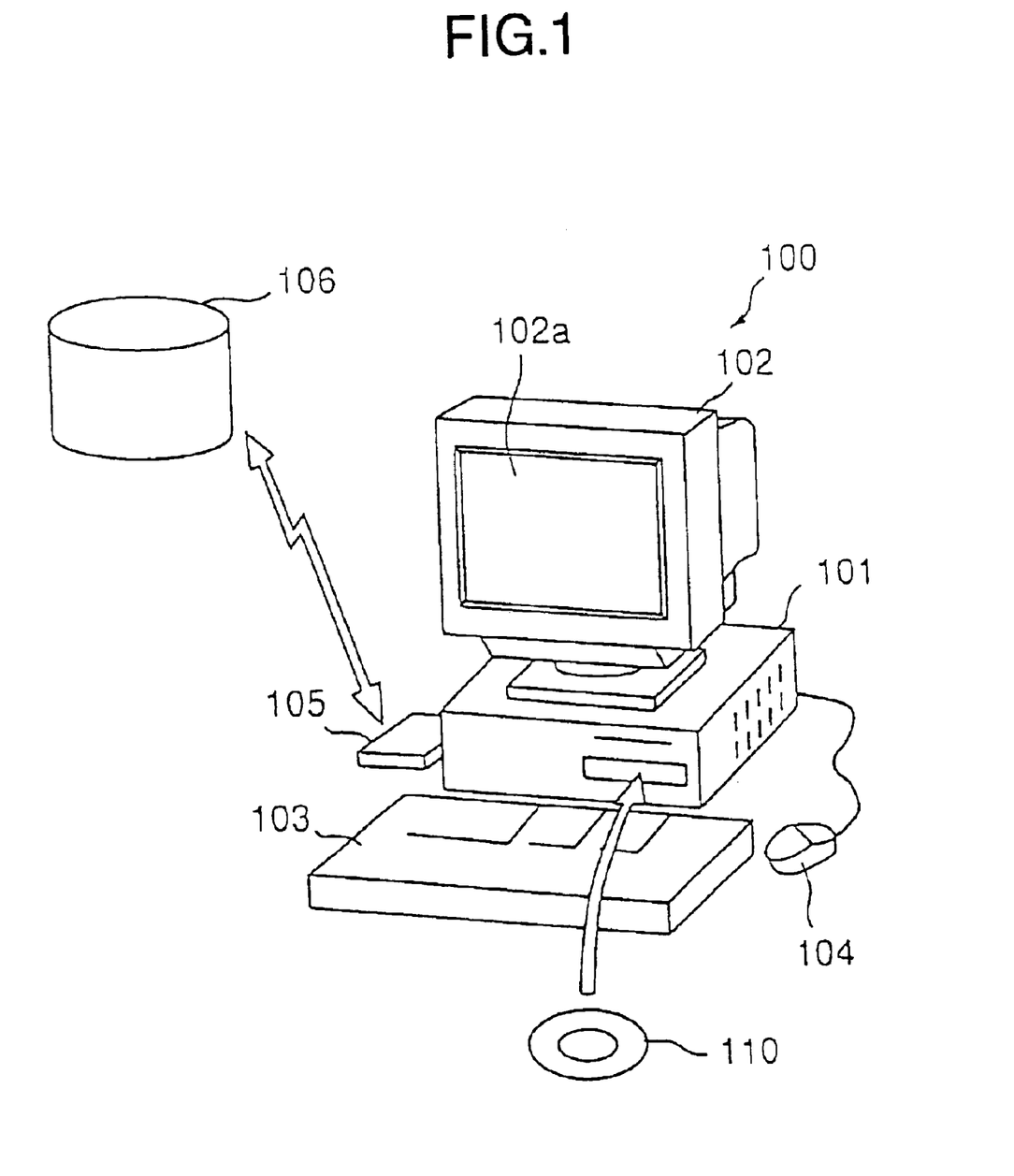
FIG. 1 is a perspective view showing an embodiment of a software editing apparatus according of the present invention.

FIG. 1 is a perspective view showing an embodiment of a software editing apparatus according to the present invention. This embodiment of the software editing apparatus employs an embodiment of a software editing method according to the present invention. In this embodiment of the software editing apparatus, the present invention is applied to a computer system.

A computer system 100 shown in FIG. 1 generally includes a main body 101 which includes a CPU, a disk drive unit and the like, a display 102 having a display screen 102a for displaying an image in response to an instruction from the main body 101, a keyboard 103 for inputting various kinds of information to the computer system 100, a mouse 104 for specifying an arbitrary position on the display screen 102a of the display 102, and a modem 105 for accessing an external database or the like and downloading programs and the like stored in another computer system.

A program (software) for causing the computer system 100 to have a software editing function, is stored in a portable recording medium such as a disk 110 or, is downloaded from a recording medium 106 of another computer system using a communication unit such as the modem 105. This program is input to the computer system 100 and is compiled therein. A computer-readable storage medium according to the present invention is formed by a recording medium such as the disk 110 which stores the program described above. The recording medium forming the computer-readable storage medium according to the present invention is not limited to portable recording media such as the disk 110, IC card memories, floppy disks, magneto-optical disks, CD-ROMs, but also includes various kinds of recording media which are accessible by a computer system which is connected via a communication means or communication unit such as the modem 105 and the LAN.

Figure 2:
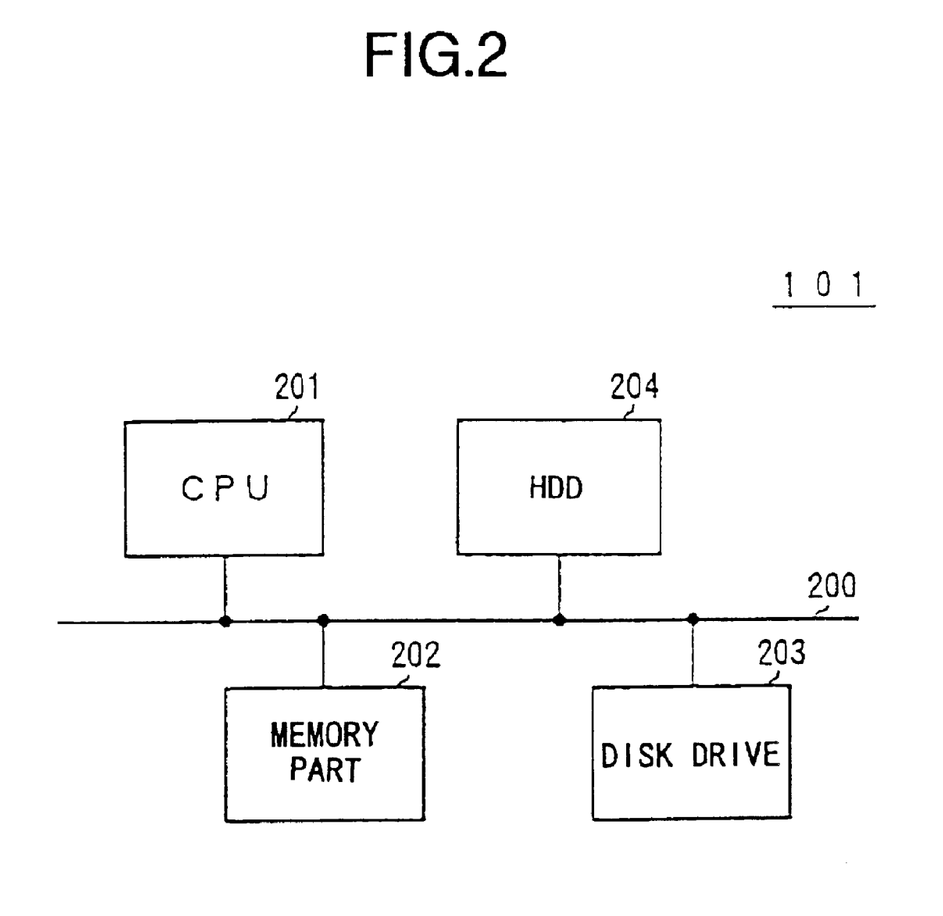
FIG. 2 is a system block diagram for explaining the construction of an important part within a main body of a computer system shown in FIG. 1.

FIG. 2 is a system block diagram for explaining the construction of an important part within the main body 101 of the computer system 100. In FIG. 2, the main body 101 generally includes a CPU 201, a memory part 202 including a RAM, a ROM and the like, a disk drive 203 for the disk 110, and a hard disk drive 204 which are connected via a bus 200. For example, the disk drive 203 may be made up of a floppy disk drive unit for the floppy disk, and a CD-ROM drive unit for the CD-ROM. The display 102, the keyboard 103, the mouse 104 and the like may be connected to the CPU 201 via the bus 200, or directly connected to the CPU 201.

The construction of the computer system 100 is of course not limited to that shown in FIGS. 1 and 2, and various other constructions may be employed. In addition, although the computer system 100 is a desk-top type system, the present invention may be applied to a portable type computer system.

Figure 3:
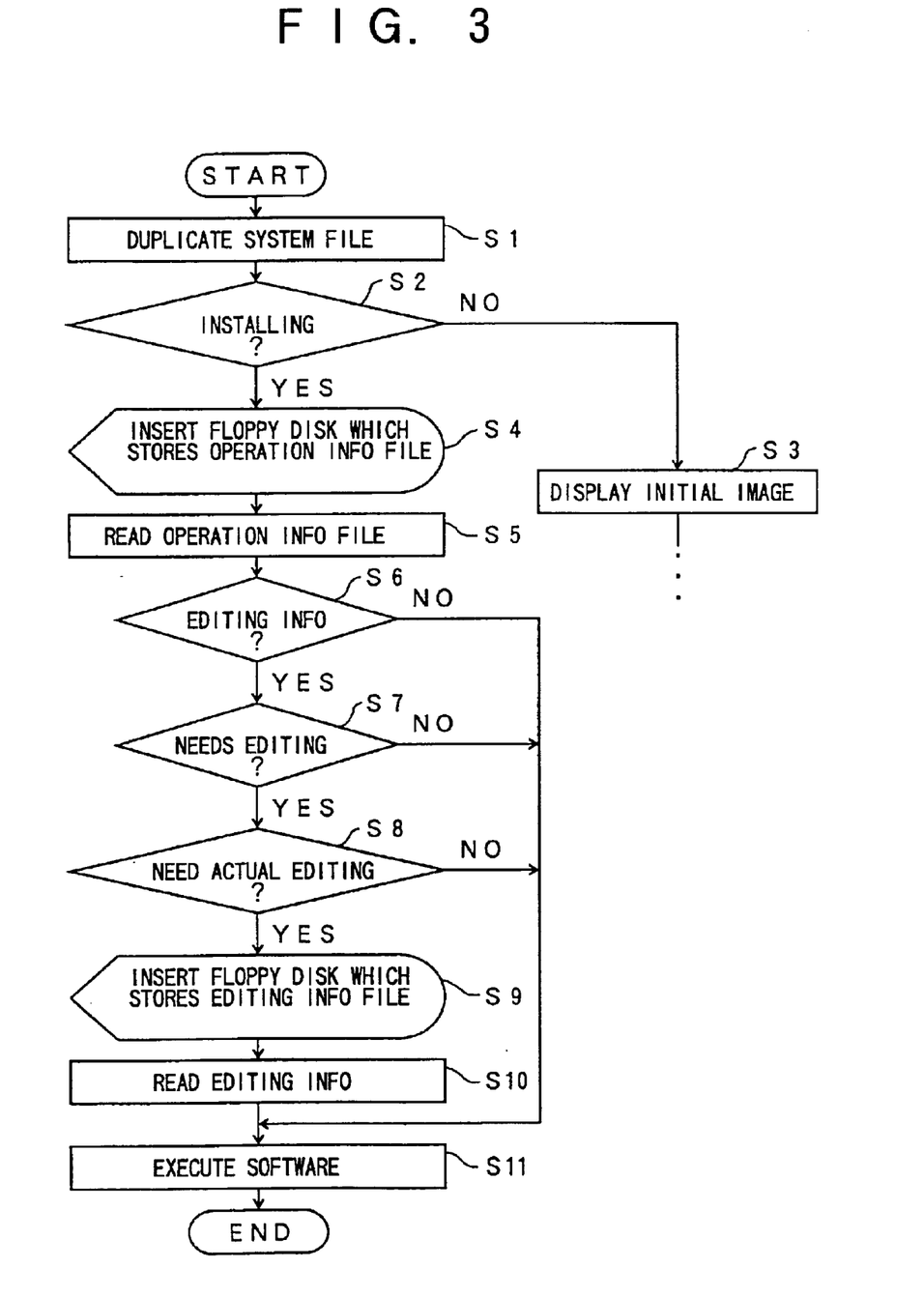
FIG. 3 is a flow chart for explaining the process of a CPU of the computer system.

First, a description will be given of the operation of the computer system 100 when carrying out a software editing. FIG. 3 is a flow chart for explaining the process of the CPU 201 of the computer system 100 in this embodiment. The process shown in FIG. 3 corresponds to the program which is stored in an embodiment of the computer-readable storage medium according to the present invention.

Figure 4:
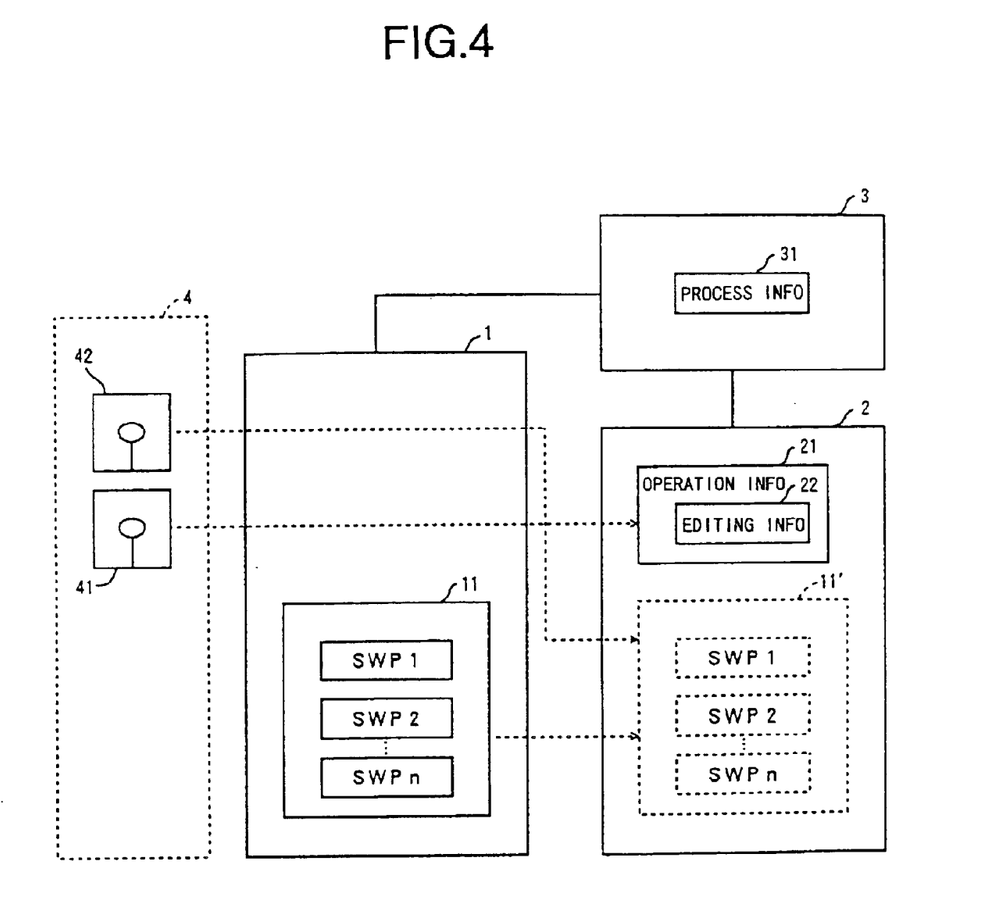
FIG. 4 is a block diagram for explaining the process shown in FIG. 3.

In addition, FIG. 4 is a block diagram for explaining the process shown in FIG. 3. In FIG. 4, a system disk 1 is a recording medium such as the CD-ROM which stores software (hereinafter referred to as a "system file") 11 which is to be edited. The system file 11 within the system disk 1 can be directly edited. A primary storage unit 2 corresponds to the memory part 202 shown in FIG. 2, for example, and information stored within the primary storage unit 2 is erased by restarting the computer system 100. An external storage unit 3 corresponds to the hard disk drive 204 shown in FIG. 2, for example, and stores process information 31 related to system files executed by the computer system 100. A floppy disk unit 4 corresponds to the floppy disk drive unit within the disk drive 203 shown in FIG. 2, for example.

For the sake of convenience, it is assumed that the system disk 1 is read by the CD-ROM drive unit (not shown) within the disk drive 203 shown in FIG. 2. In this embodiment, it is assumed that the system file 11 which is to be edited, is an installation support tool which supports the user when installing an operating system, for example, in the computer system 100.

In FIG. 3, when the computer system 100 is started by the system disk 1, a step S1 copies the system file 11 within the system disk 1 into the primary storage unit 2, so as to duplicate a system file 11'. The system file 11 includes software parts SWP1 through SWPn, and the duplicated system file 11' also includes the software parts SWP1 through SWPn. As a result, an environment is built wherein the computer system 100 can operate based on the duplicated system file 11' within the primary storage unit 2.

A step S2 decides whether or not the operating system is in the process of being installed. For example, a flag may be set only during installation of the operating system, so that the step S2 can make a decision result by checking whether or not this flag is set. If the decision result in the step S2 is NO, a step S3 displays an initial image on the display 102, and the process advances to a normal process of the computer system 100.

On the other hand, if the decision result in the step S2 is YES, a step S4 displays on the display 102 a message which urges the user to insert a floppy disk which stores an operation information file 41 into the floppy disk unit 4. When the user inserts the floppy disk into the floppy disk unit 4, a step S5 reads the operation information file 41, and stores the read operation file 41 into the primary storage unit 2 as operation information 21. The operation information file 41 includes software editing information 22 which indicates software parts which are to be edited.

Figure 5A:
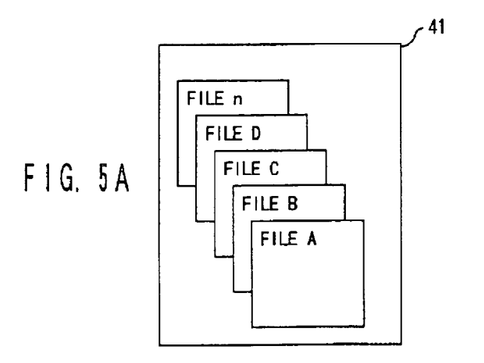
FIGS. 5A, 5B and 5C are diagrams for explaining the construction of an operation information file.
Figure 5B:
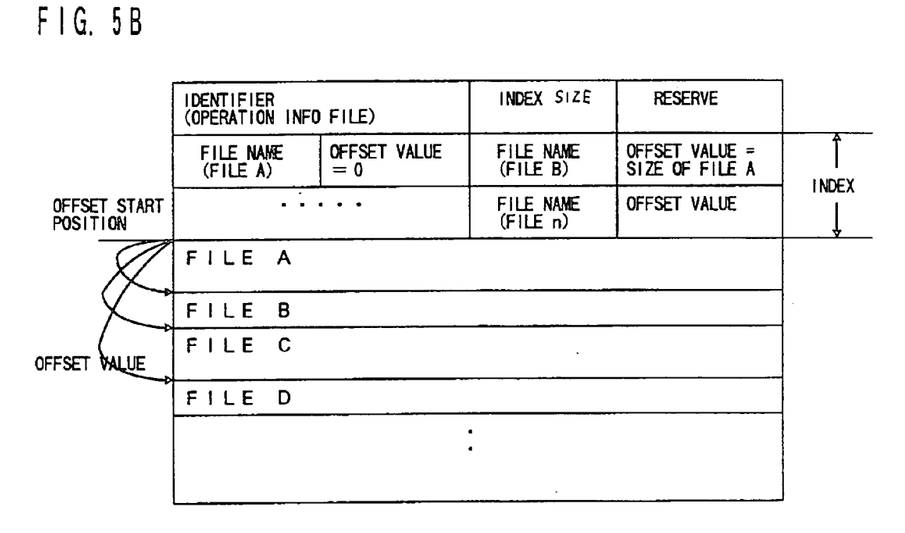
Figure 5C:
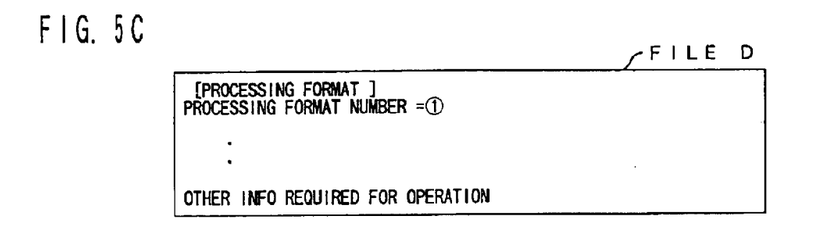

FIGS. 5A, 5B and 5C are diagrams for explaining the construction of the operation information file 41. FIG. 5A shows the general construction of the operation information file 41, FIG. 5B shows the data structure of the operation information file 41, and FIG. 5C shows one information file D of the operation information file 41.

As shown in FIG. 5A, the operation information file 41 is made up of a plurality of information files A, B, . . . which are necessary for the operation of the computer system 100. More particularly, the operation information file 41 has the data structure shown in FIG. 5B, including an identifier, an index size, a reserve, a file name of each file, an offset value of each file, and each of the files A, B, . . . of the operation information file 41. In addition, as shown in FIG. 5C, processing format numbers ①, . . . of all processing formats, and other information required for the operation are written in one file D, for example.

Returning now to the description of FIG. 3, a step S6 decides whether or not software editing information 22 is included within the operation information 21. If the decision result in the step S6 is NO, the process advances to a step S11 which executes a desired software part of the duplicated system file 11', and the process ends.

If the decision result in the step S6 is YES, a step S7 decides, based on the operation information 21, whether or not the desired software part of the duplicated system file 11' to be executed needs to be edited. If the decision result in the step S7 is NO, the process advances to the step S11 which executes the desired software part of the duplicated system file 11', and the process ends.

Figure 6:
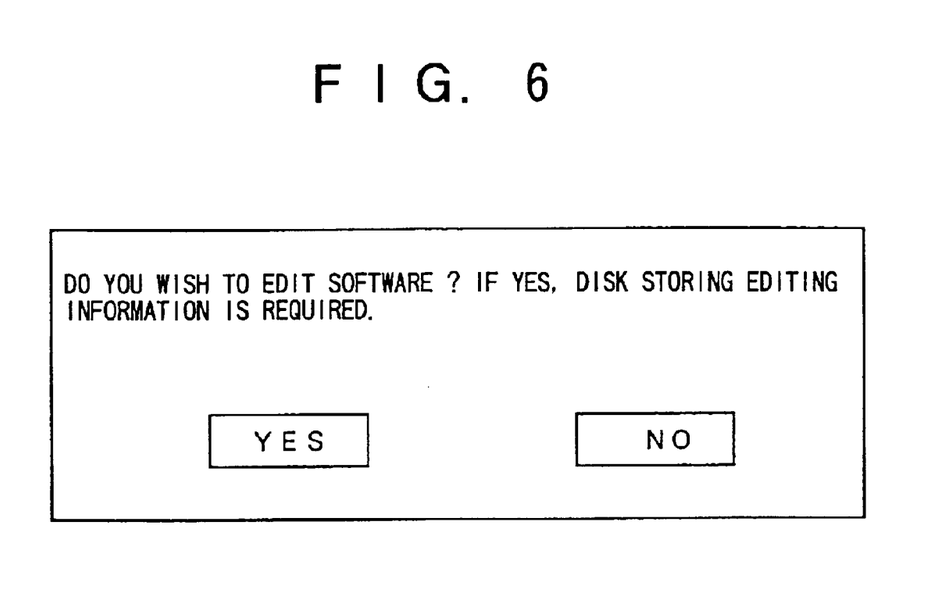
FIG. 6 is a diagram showing a message which urges a user to input an instruction as to whether or not to actually edit a desired software part which is to be executed.

If the decision result in the step S7 is YES, a step S8 decides whether or not, of the duplicated system file 11', the desired software part which is to be executed is to be actually edited. The decision of the step S8 is made based on an input made by the user, by displaying on the display 102 a message shown in FIG. 6 which urges the user to input an instruction as to whether or not the desired software part which is to be executed is to be actually edited. If the user selects a "NO" button by the mouse 104 or the like in response to the message, the decision result in the step S8 becomes NO. If the decision result in the step S8 is NO, the process advances to the step S11 which executes the desired software part of the duplicated system file 11', and the process ends.

On the other hand, if the user selects a "YES" button by the mouse 104 or the like in response to the message, the decision result in the step S8 becomes YES, and the process advances to a step S9. The step S9 displays on the display 102 a message shown in FIG. 7 which urges the user to insert into the floppy disk unit 4 a floppy disk which stores an editing information file 42 which indicates the editing contents. Of course, the floppy disk which stores the editing information file 42, and the floppy disk which stores the operation information file 41, may be the same disk.

Figure 7:
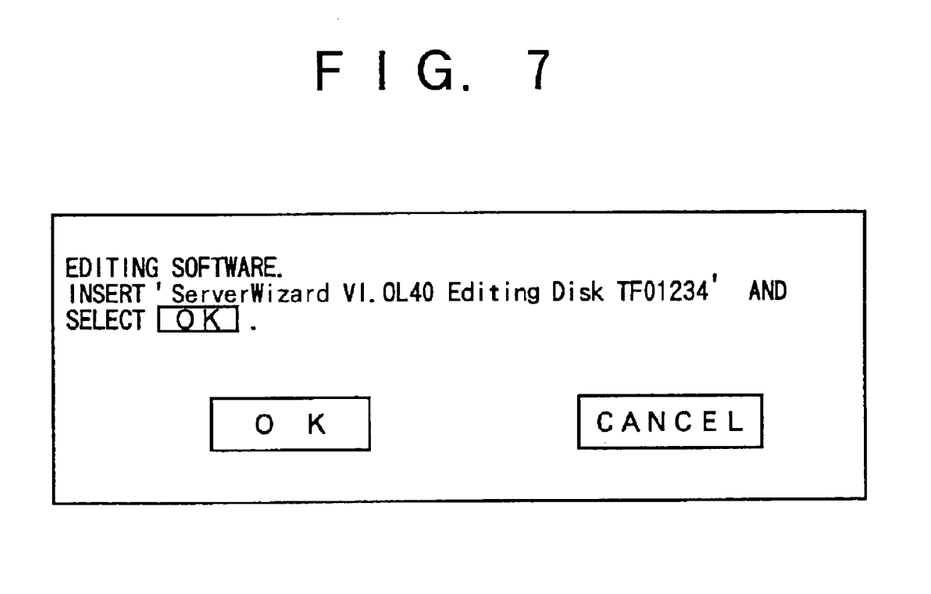
FIG. 7 is a diagram showing a message which urges the user to inset a floppy disk which stores an editing information file into a floppy disk unit.

When the user inserts the requested floppy disk into the floppy disk unit 4 and selects an "EXECUTE" button by the mouse 104 or the like in response to the message shown in FIG. 7. a step S10 reads the editing information file 42. In addition, the step S10 edits the desired software part which is to be executed, of the duplicated system file 11' within the primary storage unit 2, based on a comparison of the process information 31 stored in the external storage unit 3 and the editing information 22 within the operation information 21 stored in the primary storage unit 2. In this case, the step S11 executes the edited desired software part of the duplicated system file 11', and the process ends.

Figure 8:
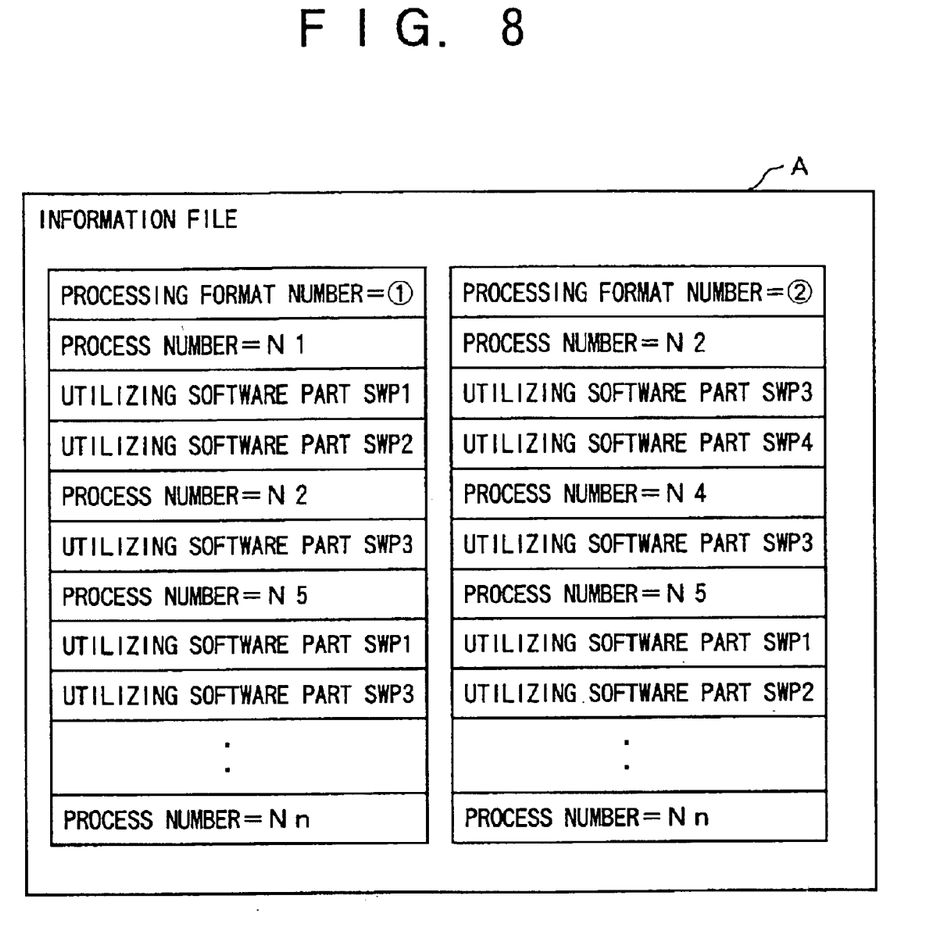
FIG. 8 is a diagram for explaining the construction of one information file within the operation information file.

FIG. 8 is a diagram for explaining the construction of one information file A within the operation information file 41. As shown in FIG. 8, the information file A shown in FIG. 5B stores, with respect to each processing format number, utilizing software information as the editing information 22. For example, with respect to the processing format number ①, utilizing software parts SWP1 and SWP2 are stored in correspondence with a process number N1, a utilizing software part SWP3 is stored in correspondence with a process number N2, utilizing software parts SWP1 and SWP3 are stored in correspondence with a process number N5, together with an indication as to whether or not each utilizing software part is to be edited, as shown in FIG. 8. In addition, with respect to a processing format number ②, software parts SWP3 and SWP4 are stored in correspondence with a process number N2, a utilizing software part SWP3 is stored in correspondence with a process number N4, utilizing software parts SWP1 and SWP2 are stored in correspondence with a process number N5, together with an indication as to whether or not each utilizing software part is to be edited.

Figure 9:
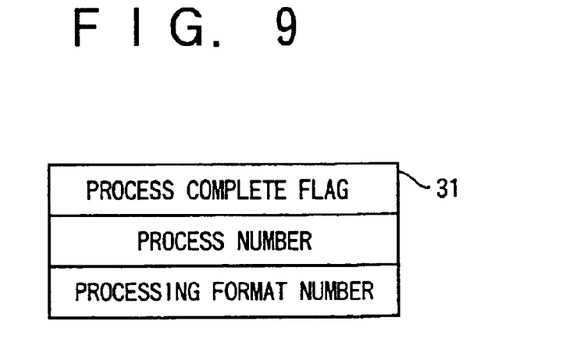
FIG. 9 is a diagram for explaining the construction of process information.

FIG. 9 is a diagram for explaining the construction of the process information 31 stored in the external storage unit 3. As shown in FIG. 9, the process information 31 includes a process complete flag, a process number, and a processing format number. The process complete flag is successively rewritten so as to indicate whether or not the process of each processing format number is ended, and to indicate whether or not the process of each process number of each processing format number is ended. Accordingly, it is possible to judge from the process information 31 the processing format and the processing state of each process of the system file 11.

In other words, by comparing the process information 31 stored in the external storage unit 3 and the processing information 22 within the operation information 21 stored in the primary storage unit 2 in the step S10 shown in FIG. 3, it is possible to detect the process number and the processing format number to which the process has advanced, and also whether or not a software part of the process number to be executed needs to be edited. In addition, from the process information 31, it is also possible to distinguish from the software parts which are to be edited, those software parts which have not yet been edited and those software parts which have already been edited. Accordingly, if a software part of a process number to be executed needs to be edited but is not yet edited, only the necessary software part can be edited according to the editing contents within the editing information file 42, and the process can be carried out according to the operation information 21.

In the embodiment described above, the operation information file 41 and the editing information file 42 are both read from the floppy disk and stored in the primary storage unit 2. However, the recording medium from which the operation information file 41 and the editing information file 42 are read is of course not limited to the floppy disk.

Moreover, it is possible to read at least one of the operation information file 41 and the editing information file 42 via a recording medium or a communication medium, and store the read file or files in the primary storage unit 2. The communication medium in this case may be a network such as the Internet, or the modem 105 shown in FIG. 1. When reading the file via the communication medium, it is possible to quickly provide the user with the editing information of the system file 11. Furthermore, compared to a case where the entire edited information system file is read via the communication medium, it is possible to greatly reduce the load on the user from the point of view of the processing time and the like.

If the network to which the connection is made is not a telephone line but is a LAN or the Internet. a network card may be used in place of the modem 105.

In addition, it is possible to read at least one of the operation information file 41 and the editing information file 42 via a communication medium and once store the read file or files into a recording medium such as the floppy disk, and then read the file or files from the floppy disk to be stored in the primary storage unit 2. In this case, the file once used does not need to be read again via the communication medium, and can simply be read from the recording medium such as the floppy disk when required.

Further, the present invention is not limited to these embodiments, but various variations and modifications may be made without departing from the scope of the present invention.

What is claimed is:

1. A software editing apparatus comprising:
    input means for inputting an editing information file which includes editing parts and editing contents with respect to a software which is provided in a form which is not directly editable;
    means for storing process information of the software that indicates a processing format and a processing state of each process of the software; and
    editing means for editing the software based on the editing information file during operation of the software by referring to the process information of the software that indicates the processing format and the processing state of each process of the software,
    wherein the editing means edits only editing parts of an executing part of the software, said editing parts being parts of the software that needs to be edited, said executing part being a part of the software to be executed.

2. The software editing apparatus as claimed in claim 1, wherein said input means inputs the editing information file via a recording medium or a communication medium.

3. A computer-readable storage medium which stores a program for causing a computer to edit a software which is provided in a form which is not directly editable, said program comprising:
    an input procedure which causes the computer to input an editing information file which includes editing parts and editing contents with respect to the software; and
    a storing procedure which stores process information of the software that indicates a processing format and a processing state of each process of the software;
    an editing procedure which causes the computer to edit the software based on the editing information file during operation of the software by referring to the process information of the software that indicates the processing format of the software and the processing state of each process of the software,
    wherein the editing procedure causes the computer to edit only editing parts of an executing part of the software, said editing parts being parts of the software that needs to be edited, said executing part being a part of the software to be executed.

4. The computer-readable storage medium as claimed in claim 3, wherein said input procedure causes the computer to input the editing information file via a recording medium or a communication medium.

5. The computer-readable storage medium as claimed in claim 3, which further stores the editing information file.

6. A software editing apparatus comprising:
    input means for inputting operation information prescribing a plurality of processing formats and editing information prescribing editing contents with respect to a software;
    specifying means for specifying editing contents of the software necessary for a process in a processing format which is selected for operation of the software;
    means for storing process information of the software that indicates a processing format and a processing state of each process of the software; and
    editing means for editing the software depending on the specified editing contents by referring to the process information of the software that indicates the processing format and the processing state of each process of the software,
    wherein the editing means edits only editing parts of an executing part of the software, said editing parts being parts of the software that needs to be edited, said executing part being a part of the software to be executed.

7. The software editing apparatus as claimed in claim 6, wherein the software is provided in a form which is not directly editable, and said editing means edits the software during operation of the software.

8. The software editing apparatus of claim 6, wherein the editing means edits the software depending on a comparison of the processing information of the software and the editing information.

9. A computer-readable storage medium which stores a program for causing a computer to edit a software, said program comprising:

an input procedure which causes the computer to input operation information prescribing a plurality of processing formats and editing information prescribing editing contents with respect to a software;

a specifying procedure which causes the computer to specify editing contents of the software necessary for a process in a processing format which is selected for operation of the software;

a storing procedure which stores process information of the software that indicates a processing format and a processing state of each process of the software; and an editing procedure which causes the computer to edit the software depending on the specified editing contents by referring to the process information of the software that indicates the processing format and the processing state of each process of the software, wherein the editing procedure causes the computer to edit only editing parts of an executing part of the software, said editing parts being parts of the software that needs to be edited, said executing part being a part of the software to be executed.

10. The computer-readable storage medium as claimed in claim 9, wherein the software is provided in a form which is not directly editable, and said editing procedure causes the computer to edit the software during operation of the software.

11. The computer-readable storage medium of claim 9, wherein the editing procedure causes the computer to edit the software depending on a comparison of the processing information of the software and the editing information.

12. A software editing method comprising:

inputting an editing information file which includes editing parts and editing contents with respect to a software which is provided in a form which is not directly editable;

storing process information of the software that indicates a processing format and a processing state of each process of the software; and editing the software based on the editing information file during operation of the software by referring to the process information of the software that indicates the processing format and the processing state of each process of the information file, wherein the editing edits only editing parts of an executing part of the software, said editing parts being parts of the software that needs to be edited, said executing part being a part of the software to be executed.

13. The software editing method as claimed in claim 12, wherein said inputting inputs the editing information file via a recording medium or a communication medium.

14. A software editing method comprising:

inputting operation information prescribing a plurality of processing formats and editing information prescribing editing contents with respect to a software;

specifying editing contents of the software necessary for a process in a processing format which is selected for operation of the software;

storing process information of the software that indicates a processing format and a processing state of each process of the software; and editing the software depending on the specified editing contents by referring to the process information of the software that indicates the processing format and the processing state of each process of the software, wherein the editing edits only editing parts of an executing part of the software, said editing parts being parts of the software that needs to be edited, said executing part being a part of the software to be executed.

15. The software editing method as claimed in claim 14, wherein the software is provided in a form which is not directly editable, and said editing edits the software during operation of the software.

16. The software editing method of claim 14, wherein the editing edits the software depending on a comparison of the processing information of the software and the editing information.

17. A software editing apparatus, comprising:

an input section to input an editing information file that includes editing parts and editing contents with respect to a software that is provided in a form that is not directly editable;

a data storage to store process information of the software that indicates a processing format and a processing state of each process of the software; and an editing section to edit the software based on the editing information file during operation of the software by referring to the process information of the software that indicates the processing format and the processing state of each process of the information file, wherein the editing section edits only editing parts of an executing part of the software, said editing parts being parts of the software that needs to be edited, said executing part being a part of the software to be executed.

18. A software editing apparatus, comprising:

an input section to input operation information prescribing a plurality of processing formats and editing information prescribing editing contents with respect to a software;

a specifying section to specify editing contents of the software necessary for a process in a processing format that is selected for operation of the software;

a data storage to store process information of the software that indicates a processing format and a processing state of each process of the software; and an editing section to edit the software depending on the specified editing contents by referring to the process information of the software that indicates the processing format and the processing state of each process of the software, wherein the editing section edits only editing parts of an executing part of the software, said editing parts being parts of the software that needs to be edited, said executing part being a part of the software to be executed.

* * * * *